United States Patent Office 2,846,875
Patented Aug. 12, 1958

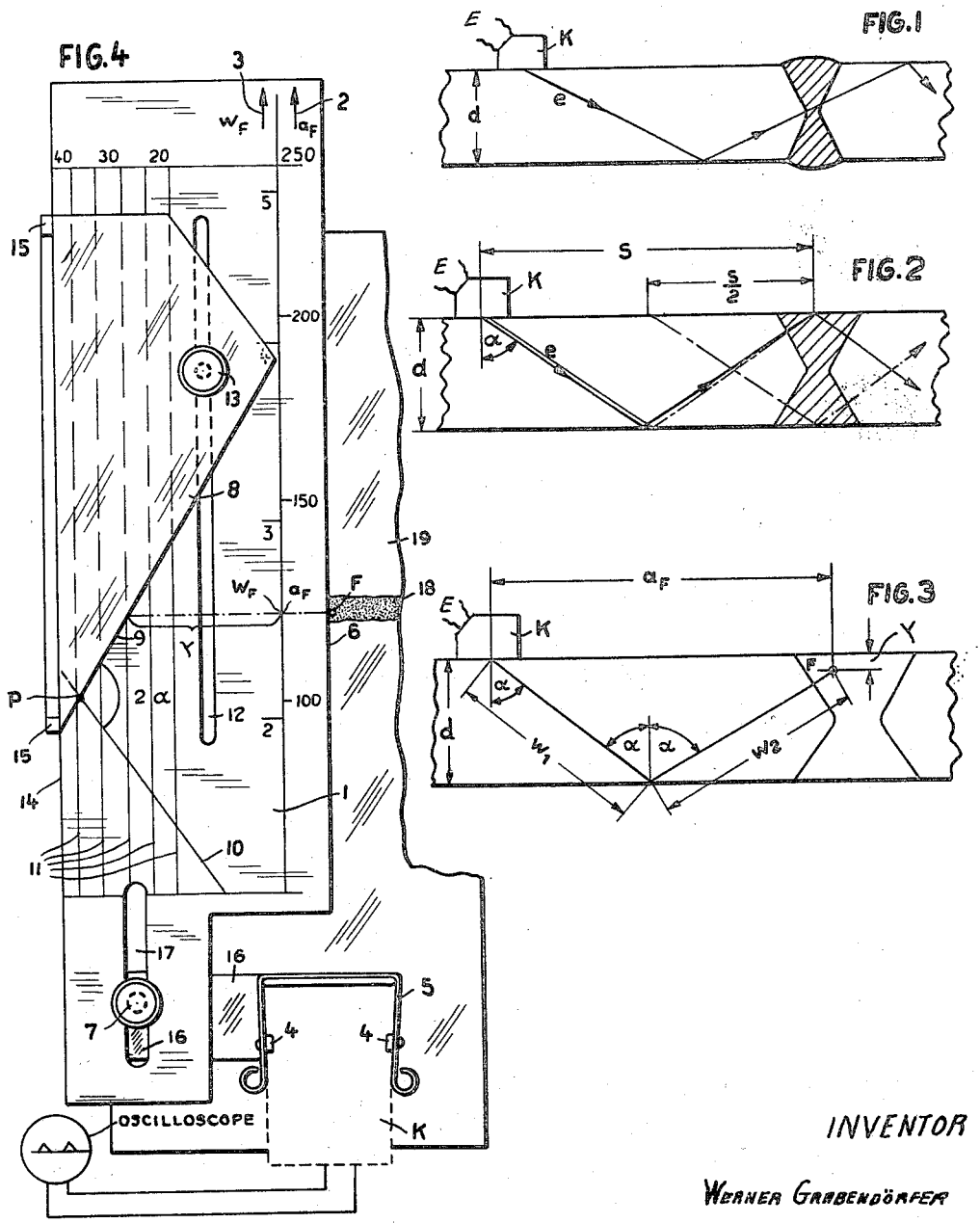

2,846,875

APPARATUS FOR LOCATING DEFECTS

Werner Grabendörfer, Leverkusen-Schlebusch, Germany, assignor to Joseph Krautkrämer and Herbert Krautkrämer, Koln-Lindenthal, Germany Application March 23, 1954, Serial No. 418,178

10 Claims. (Cl. 73—67.8)

The invention relates to a rod or scale for use in detecting defects, and more particularly to a mechanical device for locating the position of defects in the examination of work pieces, particularly sheets and especially welded seams. The arrangement is used in the super-sonic echo system.

The primary object of the invention is to provide an arrangement which makes it possible, without going through any calculations, to read directly the location and depth of defects. More particularly, the invention involves the combination of such an arrangement with a sound emitting head in such a way that the defects can be directly located upon the work piece.

It is known to locate defects in solid material by the use of super-sonic waves using the echo principal. For this purpose, a super-sonic impulse from an electro-mechanical oscillator is transmitted through the test piece which will be reflected from the flaw. The length of time which is required for the impulse to travel through the distance from the sending oscillator to the flaw and back to the receiving oscillator is measured.

The sending and receiving oscillators can be combined into a single unit. The length of time then corresponds to twice the distance from the oscillator to the defect divided by the velocity of the sound. Usually the measurement of this time is carried out with a cathode ray tube, on which the time points of sending and receiving will be indicated by the peak of a zero line. If the zero line is linear with time, then the peak is proportional to the travel time, as is also the distance to the defect. The screen of the tube can be provided with a distance scale, on which the zero point of the sending impulse lies and on which the distance of the defect can be read directly.

It is further known to send the longitudinal waves generated by the oscillator through a wedge of suitable synthetic material, such as Plexiglas, which is arranged in contact with the test piece (for example, steel), the angle of incidence of the surface between the Plexiglas and the steel being so chosen that no longitudinal waves, but only transverse waves enter the test piece at an angle to the perpendicular. Similarly, super-sonic wave impulses consisting of transverse waves only are produced with which the detection of flaws can be carried out in the same manner as above described, but with the difference that it is possible to use a direction inclined to the perpendicular. When using a wedge of Plexiglas and a steel test piece, the angle range of the transverse waves lies between about 35° and 90° to the perpendicular, depending on the angle of the Plexiglas wedge. For the measurement of the distance it is important that the velocity of the transverse waves is smaller than that of the longitudinal waves. The gauging of the scale must also be changed accordingly.

It is also known to test flat pieces with these transverse waves, making use of the fact that the transverse waves will be reflected from the surfaces, when for example these surfaces are exposed to the air and the angle of incidence used is great, for example over 30° in steel.

Further objects and advantages of the invention will appear more fully from the following description, especially when taken in conjunction with the accompanying drawings which form a part thereof.

In the drawings:

Figs. 1 to 3 are diagrams explaining the application of the invention; and

Fig. 4 shows in elevation a scale embodying the invention.

According to Fig. 1 of the drawings, the sound wave which is directed at an angle into the body runs zigzag back and forth between the faces and can serve to indicate flaws, for example, in the welding seam of two butt-welded sheets. The testing of seams in this manner depends on the super-sonic wave system.

The beam of sound waves leaving the sound transmitter K with input E has a pointed conical shape. A defect, therefore, produces the greatest echo when it lies in the axis of this beam, and it will not be detected if it is positioned at a slight angle, for example, 6° away from the axis. It is thus possible to fix the location of a defect in the beam of the sound waves by testing for the greatest response. When this is found, the defect lies in the axis of the beam.

In testing seams, the distance of the sound emitter from the seam is varied, so that, as shown in Fig. 1, the axis of the beam of sound waves passes through the seam at a height depending on the distance of the sound emitting head. In order to test the whole height of the seam, it is then necessary, according to Fig. 2, to vary the distance of the sound head from a half to a whole of the return distance. The return distance S is equal to that between two successive reflection points of the beam on the same side of the sheet and depends on the sheet thickness $d$ and on the sound beam angle $\alpha$.

If, by shifting of the sound head, a defect F is brought into the axis of the beam, it is possible to read the length of the sound path $w$ on the scale provided on the screen of the cathode ray tube. This distance is made up of the single paths $w_1$ and $w_2$ (Fig. 3), constituting the true sound path plus a virtual sound path representing the travel through the Plexiglas wedge converted to the corresponding value for steel, since the sound waves travel at different velocities in the two media. The true sound path for a distance of the head $a_F$ from the flaw measured in Fig. 3 is $$w^1 = w_1 + w_2 = a_F / \sin \alpha$$

and the virtual sound path corresponds, with the Plexiglas wedge, which it is preferred to use, to about 25 mm. in steel.

It would be too time consuming to calculate for each single point the true distance of the flaw $a$ and the depth $\gamma$ of the flaw exactly. But in practice it is very important to indicate the existence of a flaw as quickly as possible and especially to be able simultaneously to give the depth of the flaw in thick seams, so that repairs can be made as quickly and simply as possible.

The invention provides a flaw detecting rod of a mechanical nature which makes it possible to read off the position and depth of flaws mechanically.

The device according to the invention for the mechanical location of flaws based on the super-sonic echo system includes two sets of scale divisions, one of which gives the distance along the surface of the piece from the sound head and thereby the distance of the flaw $a$ while the other set of divisions, taking into consideration the virtual sound path, is proportional to the sound path scale on the cathode ray tube scale, so that the flaw echo measurement value $w_F$ appearing on the screen can be read on the sound path scale divisions of the device and the true defect distance $a_F$ along the surface of the piece on the flaw distance divisions.

Preferably the flaw locating rod is mounted on the sound head and is, therefore, moved with it along the surface of the work piece. Similarly the location of the flaw can be marked directly on the work piece at the edge of the flaw locating rod and at a point located by the peak on the cathode ray screen and the corresponding point $w_F$ on the sound path scale 3. For utilizing the device in this manner, the distance scale 2 is not necessary.

Fig. 4 shows a defect locating device embodying the invention. This includes a plate or bar 1 provided along its right hand edge 6 with two sets of scale divisions 2 and 3. Set 2 indicates distances from the sound emitting head K, preferably in millimeters, and on it can be measured the distance $a_F$ from the head K to the flaw F for example, in the weld 18 of the work piece 19. The other set 3 is divided proportionally to the scale on the screen of the cathode ray tube, and takes account of the virtual sound path as well as of the angle $\alpha$ at which the sound enters the test piece. Set 3 has the same markings as the cathode ray scale, so that the readings on the cathode ray screen 20 of the path length $w_1 + w_2$ can be read directly on the set of divisions 3. If, for example, the peak of the cathode ray tube is at approximately 2.6 on its scale, this corresponds to the point opposite F (Fig. 4) on set 3. The reading on set 2 opposite this point then represents the distance $a_F$ from the sound head to the flaw (measured along the surface of the work piece), which would be around 120 mm.

In other words, the scale 3 is proportioned taking into consideration the angle of incidence so that a given number on the scale 3 corresponding to that on the oscilloscope for a flaw actually corresponds to the distance along the surface from the head K to the flaw. Scale 2 is a linear distance scale whereby the actual distance of the head to the flaw location as determined on scale 3 may be measured. The starting points or zero points of these scales are located at the point of emission of the beam from the head.

The scale is preferably clamped on the sound head K, in such a position that its right hand edge extends along the surface of the work piece 19 in the same plane as the beam of sound emitted from the sound head. For this purpose, a spring clamp 5 clips on the side walls of the sound head K, this clamp having inward projections 4 which can engage the top of the sound head to support the clip thereon. Clamp 5 has a lateral projection 16 in which is threaded a bolt 7 passing through a slot 17 in the scale 1, so as to allow the scale to be adjusted until the zero point of set 2 is at the point of emission of the sound waves. The flaw will then be located at the point in the work piece 19 beneath point F indicated by the cathode ray tube.

The set of divisions 2 is not essential to the invention in its broadest aspects when the device is so used, since the point F can be located directly from set 3. However, set 2 allows the conversion of the readings of the cathode ray tube into lineal distances, which is advantageous in some cases.

Movable longitudinally of the scale 1 is a slider 8, preferably of transparent material. A bolt 13 set in this slider passes through a slot 12 in the body of the scale and allows the slider to be held in different positions longitudinally of the scale. At its other edge, slider 8 has projections 15 which engage the left hand edge 14 of scale 1 and hold the slider against tilting. Slider 8 is generally triangular in shape, and has a slanting edge 9 at an angle corresponding to the angle of the reflected sound path $w_2$ within the material.

The scale has on its surface a line 10 intersecting edge 9 of the slider, at an angle to edge 6 equal to the angle at which the beam of sound waves enters the test piece 19, and thus corresponding to the line $w_1$. This line passes substantially through the zero point of set 2 along edge 6. The scale also has one or more lines 11 parallel to edge 6 and preferably marked to indicate varying thicknesses of the material being tested.

Assuming the test piece 19 to have a thickness of 35 mm., slide 8 is adjusted along the scale 1 until its edge 9 intersects the line 10 at the point P of intersection of line 10 with the line 11 corresponding to such a thickness. If now, as in the example given above, the cathode ray tube shows a reading of 2.6 ($w_F$ in Fig. 4), the depth of the flaw within the workpiece 19 will correspond to the distance between point $w_F$ and the edge 9 of slider 8, measured perpendicularly to edge 6. Thus the operator, by moving the sound head along the work piece 19 until he gets a maximum echo, knows that there is a defect beneath point F at a depth $\gamma$.

The device according to the invention can be modified in various ways from the specific construction described without departing from the spirit of the invention. For example, there may be more than one line 10, for use with sound heads which emit the beam of sound waves into the material at different angles, while the transparent slider 8 might carry several diverging lines corresponding to different angles of reflection and cooperating with the different lines 10.

While I have described herein some embodiments of my invention, I wish it to be understood that I do not intend to limit myself thereby except within the scope of the claims hereto or hereinafter appended.

I claim:

1. In combination with a sound wave emitting and echo detecting and measuring device for detecting flaws in objects and having a sound head adapted to rest on the object, said head including means to transmit sound wave pulses into the object at an angle to the surface thereof and to receive echos of reflected sound wave pulses, said device further including a cathode ray tube connected to said sound head for representing visually said pulse echos, said tube having division marks thereon by which the length of the sound path from the head to a flaw is indicated, a member mounted on said head and extending therefrom in the direction in which sound waves are emitted into the object and adapted to lie beside the object, said member having thereon a set of divisions extending in a direction parallel to the surface of the object proportional to those on the cathode ray tube and calibrated in accordance with the angle of emission of the sound head, said divisions having their zero point at the point of emission of the pulses, whereby the distance of a flaw from the sound head along the surface of the object can be found directly from said set of divisions.

2. In a device as claimed in claim 1, said member having another set of divisions adjacent said first set and indicating length.

3. In a device as claimed in claim 1, said member having a part movably mounted thereon provided with a line at an angle to said set of divisions equal to the angle at which the sound waves are reflected within the object, and means to position said part so that said line intersects said set of divisions at a point opposite the point where the line of direction of the reflected sound wave meets the surface of the object, the distance in a direction perpendicular to the edge of the member which lies beside the object from the point on the set of divisions opposite the defect to such line representing the depth of the defect within the object.

4. In a device as claimed in claim 1, said member having a line thereon at an angle to said set of divisions equal to the angle at which the sound waves enter the object, said line intersecting the edge of the member which lies beside the object at a point opposite the zero point of said line of divisions, means on said member forming a second line at an angle to said set of divisions equal to the angle at which the sound waves are reflected within the object, means to position said second line forming means so that the lines intersect at a distance in a direction perpendicular to the edge of the member which lies beside the object from such set of divisions equal to the thickness of the object, the distance in a direction perpendicular to the edge of the member which lies beside the object from the point on the set of divisions opposite the defect to such second line representing the depth of the defect within the object.

5. In a device as claimed in claim 4, said second line forming means including a part slidable parallel to the set of divisions and having a slanting edge forming said second line, thereby allowing the depth of the flaw in objects of varying thickness to be measured.

6. In a device as claimed in claim 5, said member having a further set of lines parallel to the set of divisions corresponding to different thickness of the objects, said part being moved until said second line passes through the point of intersection of the first line with the line of such further set corresponding to the thickness of the object being measured.

7. A scale for use in connection with a sound wave emitting and echo detecting and measuring device for detecting flaws in objects including a cathode ray tube having division marks thereon proportional to the distance traveled by a sound wave entering a test piece from an emitter and reflected back to the emitter, said scale comprising a member having thereon a set of divisions proportional to those on the cathode ray tube and calibrated in accordance with the angle of emission of the sound head whereby the distance of a flaw from the sound head along the surface of the object can be found directly from said set of divisions, and a part movably mounted on said member and having a line at an angle to said set of divisions equal to the angle at which the sound waves are reflected within the object, and means to position said part so that said line intersects said set of divisions at a point opposite the point where the line of direction of the reflected sound wave meets the surface of the object, the distance in a direction perpendicular to the edge of the member which lies beside the object from the point on the set of divisions opposite the defect to such line representing the depth of the defect within the object.

8. A scale for use in connection with a sound wave emitting and echo detecting and measuring device for detecting flaws in objects including a cathode ray tube having division marks thereon proportional to the distance traveled by a sound wave entering a test piece from an emitter and reflected back to the emitter, said scale comprising a member having thereon a set of divisions proportional to those on the cathode ray tube and calibrated in accordance with the angle of emission of the sound head whereby the distance of a flaw from the sound head along the surface of the object can be found directly from said set of divisions, said member having a line thereon at an angle to said set of divisions equal to the angle at which the sound waves enter the object, said line intersecting the edge of the member which lies beside the object at a point opposite the zero point of said line of divisions, means on said member forming a second line at an angle to said set of divisions equal to the angle at which the sound waves are reflected within the object, means to position said second line forming means so that the lines intersect at a distance in a direction perpendicular to the edge of the member which lies beside the object from such set of divisions equal to the thickness of the object, the distance in a direction perpendicular to the edge of the member which lies beside the object from the point on the set of divisions opposite the defect to such second line representing the depth of the defect within the object.

9. In a device as claimed in claim 8, said second line forming means including a part slidable parallel to the set of divisions and having a slanting edge forming said second line, thereby allowing the depth of the flaw in objects of varying thickness to be measured.

10. In a device as claimed in claim 9, said member having a further set of lines parallel to the set of divisions corresponding to different thickness of the objects, said part being moved until said second line passes through the point of intersection of the first line with the line of such further set corresponding to the thickness of the object being measured.

References Cited in the file of this patent

UNITED STATES PATENTS

| | | |
|---|---|---|
| 2,527,986 | Carlin | Oct. 31, 1950 |
| 2,660,054 | Pringle | Nov. 24, 1953 |